United States Patent [19]

Smith et al.

[11] 4,015,258
[45] Mar. 29, 1977

[54] WEAPON AIMING SYSTEM

[75] Inventors: William W. Smith, Palos Verdes Peninsula; John N. Monroe, Altadena, both of Calif.

[73] Assignee: Northrop Corporation, Los Angeles, Calif.

[22] Filed: Apr. 7, 1971

[21] Appl. No.: 132,190

[52] U.S. Cl. .............................. 343/6 R; 89/41 L; 343/7 ED; 356/5
[51] Int. Cl.² .......................................... G01S 9/62
[58] Field of Search ......... 89/41 ME, 41 SW, 41 L; 244/3.13, 3.14, 3.19; 343/6 R, 6 ND, 7 R, 7 ED, 7 G, 7.3, 18 C; 356/5

[56] References Cited

UNITED STATES PATENTS

| | | | |
|---|---|---|---|
| 2,414,103 | 1/1947 | Hunter | 89/41 SW |
| 2,557,949 | 6/1951 | Deloraine | 244/3.14 |
| 2,745,095 | 5/1956 | Stoddard | 244/3.13 |
| 3,053,134 | 9/1962 | Bjornson | 356/5 |
| 3,181,147 | 4/1965 | Crawford et al. | 343/7 G |
| 3,380,358 | 4/1968 | Neumann | 356/5 |
| 3,757,632 | 9/1973 | Bellinger | 89/41 L |

OTHER PUBLICATIONS

Merrill I. Skolnik, INTRODUCTION TO RADAR SYSTEMS, "Tracking in Range", pp. 189–190, c. 1962.

*Primary Examiner*—Stephen C. Bentley
*Attorney, Agent, or Firm*—William W. Rundle; Willard M. Graham

[57] ABSTRACT

A gun aiming system having target ranging means, wherein the operator observes the position of backscattered radiation from a bullet or bullets at the target range relative to a simultaneous visually observed target position. A diverged laser beam is reflected back from a special reflector in the rear of the bullet and received in an optical system which produces an image-like indication in an operator's combining glass. A range gating technique images only the bullets at the same range as the target. The resulting real-time display of the target and the bullet in the target plane simultaneously permits the operator to place the direction of fire so that the two images coincide, thus producing a hit.

7 Claims, No Drawings

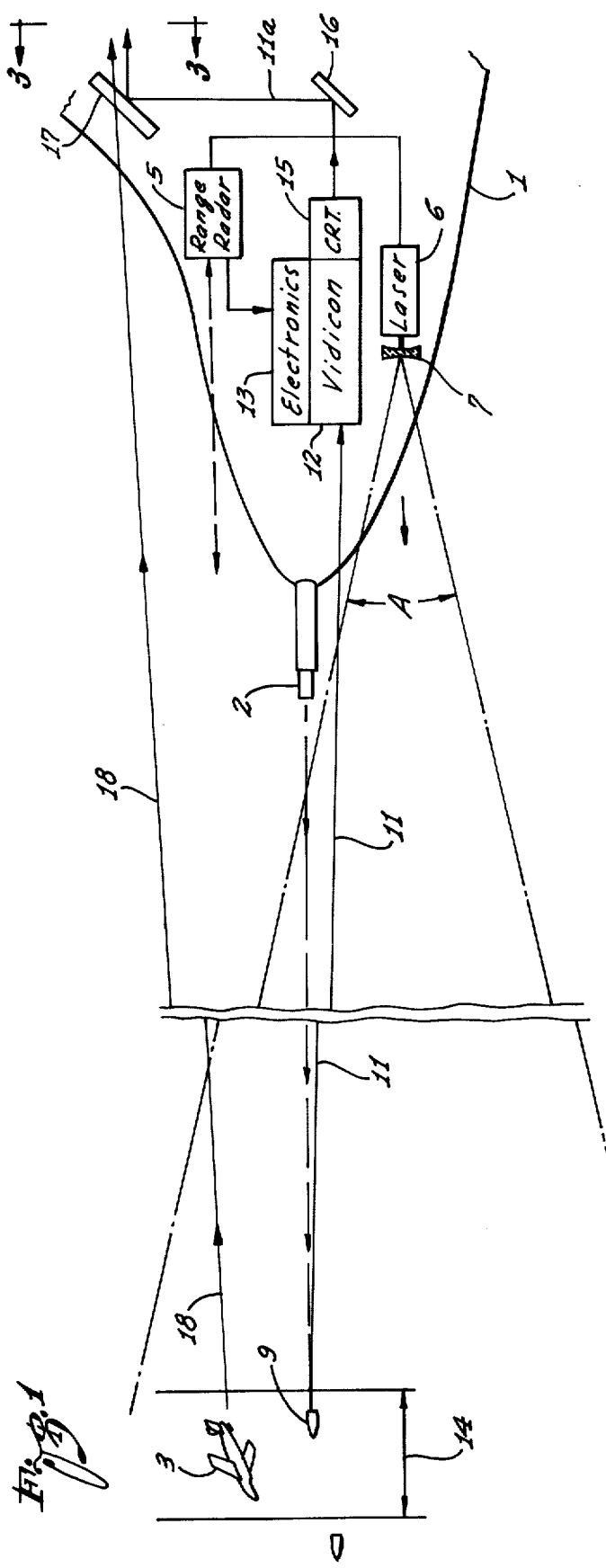
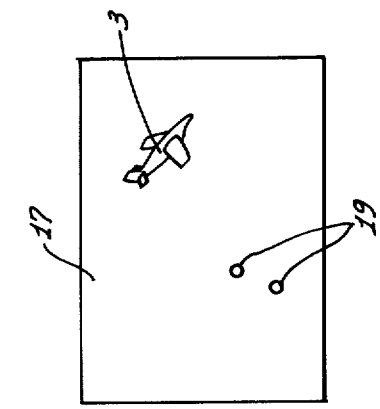
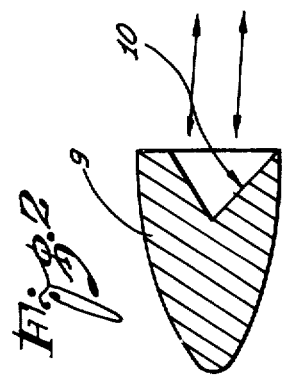

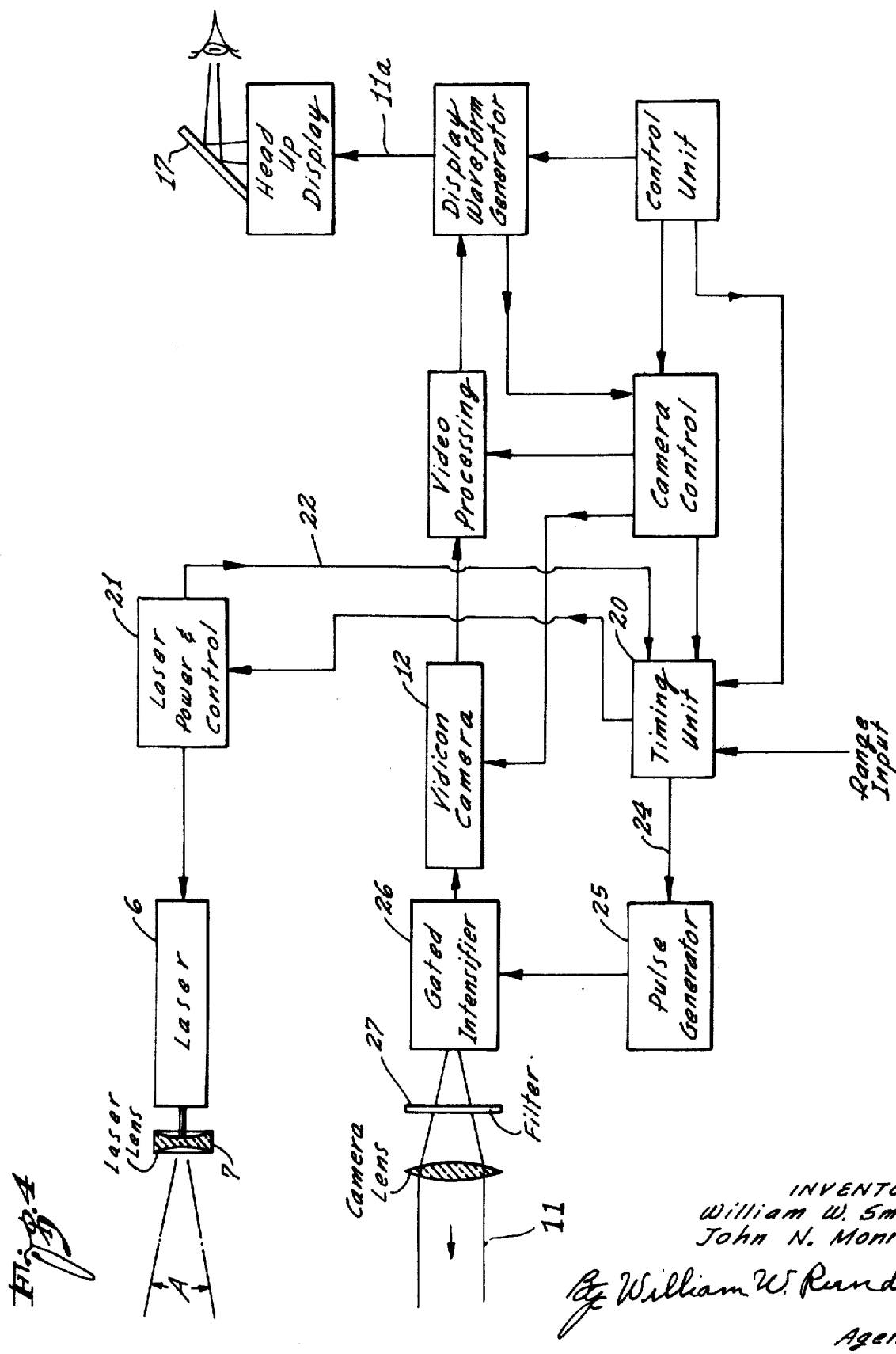

WEAPON AIMING SYSTEM

The present invention relates to ordnance, and more particularly, to a gun or other weapon aiming system operating from a given station to a relatively moving target.

In the aircraft field, for example, it has been the practice to provide the pilot with a fire control system and gun sight by which he can aim his gunfire at a target aircraft. The modern systems have become very complex and expensive lead-computing mechanisms which compute the necessary direction of fire from determination of the target's position and velocity. Such systems are not able, however, to provide for evasive maneuvers or variation in the velocity and are therefore unsatisfactory in these respects.

Tracer bullets have been and are frequently used to enable the gunner to see where his shots are going. It can be understood, however, that the visual path of the tracers may seem to be hitting on target when actually they can be in front of or beyond the target. Another disadvantage is that tracers obviously show an enemy the direction and/or position of the gun firing the tracer bullets. Also, tracer bullets have a different trajectory than the standard rounds.

It is an object of this invention to provide a method and means of indicating to the pilot or other gun operator the real time position of his fired bullet, or projectile, only as it passes through a certain range of points at a distance substantially equal to the target range, and to show this position relative to the target itself. In this manner, he can instantly tell which way and how much to adjust his firing angle to cause a hit, and he will know that a hit has actually been scored when the indicated bullet position coincides with or is within the confines of his view of the target.

Another object of our invention is to provide a bullet or other projectile with reflecting means whereby it can be tracked by light during its flight.

It is another object of this invention to provide a means for light tracking a bullet in flight and for showing on a monitor not the entire trajectory of the bullet but only the bullet positions at the target plane.

Briefly as to method, our invention comprises determining the range of a target, visually indicating to a gun operator the image of a bullet or bullets only when passing through the target range, the bullet image or images being indicated in exact relative position to a simultaneous indication of the position of the target.

Briefly as to apparatus, our invention comprises target range finding means, illuminating means for projecting a diverging beam in the direction of the target, means for receiving reflected beam radiation from a fired projectile, and means for combining a visual representation of the target and the reflected beam in correct relative position to an operator of the gun firing said projectile, the reflected radiation visible to the operator being only that reflected during the time the projectile is at a distance substantially equal to target range.

This invention will be more fully understood from the detailed description of a specific embodiment thereof to follow, together with reference to the accompanying drawings.

In the drawings:

FIG. 1 is a pictorial diagram illustrating the principles, main components and operation of the present gunsight invention.

FIG. 2 is a longitudinal section view of a bullet illustrating the light reflecting means thereon.

FIG. 3 is a gunner's view of a sighting glass, viewed as indicated by line 3—3 in FIG. 1, showing the indication provided by the gunsight system.

FIG. 4 is a block diagram of a complete embodiment of the present gunsight invention.

Referring first to FIG. 1, this drawing shows the present invention as applied to an air-to-air gunsight system. An airplane 1 carrying a forward-firing machine gun or cannon 2 is chasing a target aircraft 3. A conventional type of radar set 5 is used to determine the range of the target aircraft 3.

A laser 6 in the airplane 1 is provided with a diverging lens 7 to spread the laser beam out through a conical angle A. For this system, a pulsed crystal laser is preferred, and the laser angle A can be any suitable angle which will preferably keep a maneuvering target in the beam, such as around 40° or less. As the gun 2 is fired, the laser light is reflected back from the rear of a special bullet 9, as further shown in FIG. 2. This bullet 9 is made with a retro-reflector 10 formed in its rear side. This may be a corner cube, which reflects light back in the same direction from which it came, even if it is offaxis or at any angle still permitting its entrance into the reflector. Each bullet may be so formed, or the reflecting bullets may be alternated with a suitable number of standard bullets as desired.

The reflected laser beam 11 is picked up by an optical detector comprising a vidicon system 12 (or other suitable image-forming video pick-up). The range information from radar set 5 is fed to the vidicon system through range gating electronics 13 to allow the reflected light to enter the system from the bullets 9 only when they are at the same range as the target aircraft 3, i.e., in a normal target plane. The enabling range gate pulse will have a practical width corresponding to substantially a target length distance 14 so that reflected radiation from a bullet throughout this distance will be admitted to the detector and display.

Gated light pulses pass from the vidicon system 12 via a cathode ray tube 15 where mirror 16 reflects the light upward to reflect off of a suitable half-reflecting, half-transmitting combining glass 17 as used in many optical gun sights. Glass 17 is positioned at a 45° down angle across the field of view in front of the pilot. The target aircraft 3 may be seen along line 18 through this glass 17, and the projected bullet indications (herein called images) are also seen from line 11a as reflected back from glass 17 to the pilot. Optical lenses are also preferably used between the cathode ray tube 15 and the combining glass 17 to collimate the light from the tube 15. This makes the position of the bullet indications appear as if they are out in space with the target. Therefore, the relation of the bullet images and target remains the same as the pilot's head is moved.

FIG. 3 is a pilot's eye view of the scene coming through or being reflected from the combining glass 17, showing a typical indication of target aircraft 3 and bullets 19 as they are passing through the target range. This indicates the location of each in respect to the other and therefore the direction the pilot must move his aim in order to hit the target. A short burst of gunfire is required in order to produce these transient bullet images.

A better understanding of this invention may be obtained by considering an example of actual operation. When the target is within range and is visible through the glass 17, the pilot fires a short burst from his gun 2 and watches to see where the bullet images 19 will appear. Assuming a target range of 3,000 feet and a muzzle velocity of 3,000 feet per second, for example, the bullet images 19 will appear at target range in a little more than one second after firing. After seeing the relation of bullets to target, the pilot will direct his airplane 1 in the proper direction to superimpose the indications. Another short burst, or firing at will, will show the corrected position, and when the target and bullet images coincide, hits are made.

Technically, there might be a return of laser light from some part of the target aircraft 3, but it will not interfere with system operation or gunner's interpretation. If desired, the detector system can be modified to eliminate any return of light from the target.

FIG. 4 shows in more detail an embodiment of the present invention. The range input from the independent radar set 5 is fed to a timing unit 20. At the instant the laser 6 is pulsed, a signal from the laser control 21 on conductor 22 also goes to the timing unit 20. This signal is delayed in the timing unit for a period of time, depending on the range, necessary for the laser pulse to make a round trip to and from the target plane, and the delayed signal is sent on line 24 to a pulse generator 25 supplying an image intensifier 26 which acts as a shutter. This range gating technique is conventional. Thus, only bullets 9 near the target aircraft 3 will be presented by the pilot's display, and this is how our invention indicates the exact placement of bullets at the target range only. If the range is 3,000 feet, for example, the above time delay is about 6.1 micro-seconds. In continued operation, the range data and the subsequent bullet image position from the combining glass 17 is constantly updated to present a display in real time.

A narrow band filter 27 is preferably placed in front of the detection optics to limit spurious signals from background and clouds, for example. The remaining components shown in FIG. 4 are conventional in structure and in operation and need not be described in detail.

Other embodiments of the invention may obviously be constructed and used. For instance, the target range may be determined by pulsing the laser 6 and noting the round trip time to the target aircraft 3, thereby eliminating the need for a separate radar. In that case, the laser return used for ranging would obviously be subsequently gated out of the picture displayed to the gunner/pilot. Further, the laser may be used to furnish bullet position to the pilot's display at additional specific distances other than at target range, if desired, so long as the pilot still knows what bullet image (or images) formed by the display represents the target plane information. The laser pulsing could be synchronized with the gun firing. If it is not, then a minimum firing rate is necessary to insure that a bullet is observed by the system. Also, the details of the bullet retro-reflector 10 are not critical to this invention and any suitable configuration may be used. The bullet may have one retro-reflector or many small ones.

Moreover, the same concept and similar arrangement of parts can be used as a ground-to-air sighting system, surface-to-air, air-to-surface or the like. Furthermore, in case of nighttime operations, or weather conditions in which the target is not visible to the eye, the same means and method as herein disclosed can be employed if an image of the target's position is provided on the combining glass by additional means, such as by radar for example. The present invention encompasses the use of light energy of any sort for illuminating the projectile, including the infrared and the ultraviolet.

Thus it is seen that the present invention is based on a new and novel principle differing from the conventional fire control systems, and is simpler and more accurate as well. Regardless of what evasive maneuvers are attempted by the moving target, the exact relative position of the target and shots fired is displayed. This system is also independent of relative velocity of the target and gun installation.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is;

1. The method of indicating to an aircraft gun operator or the like the real time position of a bullet fired from his gun at a target rapidly changing direction relative to the gun's line of fire, the position indication of the bullet being as the bullet passes through the target range, comprising: determining the range of said target, providing a reflective means on the rear of said bullet, transmitting a diverged pulsed light beam of between about 10° and about 40° conical angle in the general direction of the bullet path, to thus keep the bullet in said beam as the gun's line of fire changes, detecting the reflected light from said bullet, and imaging said reflected light into the line of sight of the gun operator in true relative azimuth and elevation position to a simultaneous indication of the position of said target, said reflected light being admitted to said line of sight only during the time interval when said bullet is substantially at the range of said target.

2. An aiming system enabling an aircraft gunner or the like to hit a target rapidly changing direction relative to his gun's line of fire, comprising target range finding means, illuminating means for projecting a diverging light beam of between about 10° and about 40° conical angle in the general direction of a projectile as fired from the gun, to thus keep said projectile in said beam as the gun's line of fire changes, optical means for receiving reflection of said light beam from said fired projectile, projection means for combining the light output of said optical means and a direct visual sight of said target in relative position to the gunner, and range responsive means for passing from said optical means to said gunner only the light reflected from said projectile when it is at a distance substantially equal to said range.

3. Apparatus in accordance with claim 2 including a plurality of projectiles to be fired, at least some of which have reflective means on the rear for returning radiation in substantially the same direction from which it came.

4. Apparatus in accordance with claim 2 including a combining glass in the field of view of said gunner, said glass adapted to transmit a direct view of said target to said gunner, and wherein said projection means directs said passed light output of said optical means onto said glass at the necessary angle to project an image of said projectile into the gunner's line of sight along with said target, said illuminating means including a diverging lens for producing said diverging conical light beam.

5. Apparatus in accordance with claim 4 wherein said optical means, said projection means and the center of said combining glass are all aligned in the same centerline plane with the gunner's line of sight and the gun fire.

6. Apparatus in accordance with claim 2 wherein said aiming system is installed aboard an aircraft, and wherein said illuminating means is a laser mounted in fixed general alignment with the longitudinal axis of said aircraft.

7. An aircraft gun sighting system enabling an aircraft gunner to hit an evasive target capable of maneuvers rapidly changing its direction relative to the aircraft line of flight, comprising:
   a. a fixed forward-firing gun in the aircraft;
   b. radar means in said aircraft for determining target range;
   c. a pulsed laser fixed in said aircraft to project a forward beam in general alignment with the longitudinal axis of said aircraft;
   d. diverging lens means in front of said laser for producing a diverging light beam of between about 10° and about 40° conical angle centered about the center line of said laser, to thus keep projectiles fired from said gun within said beam as the gun's line of fire changes;
   e. reflector means on the rear of at least a portion of said projectiles fired at said target;
   f. optical means in said aircraft for receiving laser reflection from said reflector means;
   g. projectile image forming means connected to said optical means;
   h. range responsive means connected to said radar means to block all projectile images except those received from projectiles at a distance substantially equal to said target range;
   i. optical combining sight means positioned in the field of view of the gunner to the target, said sight means adapted to transmit a direct view of said target to said gunner; and
   j. image projecting means arranged to project all unblocked projectile images onto said sight means;
   k. said sight means being fixed at an angle to direct said unblocked projectile images into the line of sight of said gunner in true relative position with respect to said target as seen through said sight means.

* * * * *